United States Patent
Bailey

(10) Patent No.: US 9,948,687 B2
(45) Date of Patent: Apr. 17, 2018

(54) NETWORK INTERFACE DEVICE AND METHOD HAVING PASSIVE OPERATION MODE AND NOISE MANAGEMENT

(71) Applicant: PPC Broadband, Inc., East Syracuse, NY (US)

(72) Inventor: Paul Francis Bailey, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 15/725,853

(22) Filed: Oct. 5, 2017

(65) Prior Publication Data
US 2018/0034863 A1    Feb. 1, 2018

Related U.S. Application Data

(62) Division of application No. 14/056,566, filed on Oct. 17, 2013, now Pat. No. 9,813,458.

(60) Provisional application No. 61/714,930, filed on Oct. 17, 2012.

(51) Int. Cl.
| | |
|---|---|
| H04L 12/28 | (2006.01) |
| H04L 29/06 | (2006.01) |
| H04L 12/26 | (2006.01) |
| H04N 7/10 | (2006.01) |

(52) U.S. Cl.
CPC ...... *H04L 65/1069* (2013.01); *H04L 12/2801* (2013.01); *H04L 12/2898* (2013.01); *H04L 43/16* (2013.01); *H04N 7/104* (2013.01)

(58) Field of Classification Search
CPC ............. H04L 65/1069; H04L 12/2801
USPC .......................................... 370/420
See application file for complete search history.

(56) References Cited

U.S. PATENT DOCUMENTS

| | | | |
|---|---|---|---|
| 4,430,731 A | | 2/1984 | Gimple et al. |
| 5,023,942 A | * | 6/1991 | Goepel ............ H04L 12/423 |
| | | | 398/173 |
| 5,073,822 A | | 12/1991 | Gumm et al. |
| 5,125,100 A | | 6/1992 | Katznelson |
| 5,126,840 A | | 6/1992 | Dufresne et al. |
| 5,481,389 A | | 1/1996 | Pidgeon et al. |
| 5,604,528 A | | 2/1997 | Edwards et al. |
| 5,742,591 A | | 4/1998 | Himayat et al. |
| 5,747,888 A | | 5/1998 | Zilberberg |
| 5,930,678 A | | 7/1999 | Alley et al. |
| 5,937,330 A | | 8/1999 | Vince et al. |
| 6,091,932 A | | 7/2000 | Langlais |
| 6,094,211 A | | 7/2000 | Baran et al. |
| 6,160,572 A | | 12/2000 | Matsuura |
| 6,321,384 B1 | | 11/2001 | Eldering |

(Continued)

FOREIGN PATENT DOCUMENTS

WO    0111767 A1    2/2001

OTHER PUBLICATIONS

Jon-En Wang, "House Amplifier With Return Path Gating", U.S. Appl. No. 12/487,367, filed Jun. 18, 2009.

(Continued)

*Primary Examiner* — Samina Choudhry
(74) *Attorney, Agent, or Firm* — MH2 Technology Law Group LLP

(57) ABSTRACT

A system, method and device provide passive operation mode and noise management. The system, in one embodiment, includes power loss bypass and upstream noise management.

14 Claims, 9 Drawing Sheets

(56) References Cited

U.S. PATENT DOCUMENTS

| | | |
|---|---|---|
| 6,466,913 B1 | 10/2002 | Yasuda et al. |
| 6,542,540 B1 | 4/2003 | Leung et al. |
| 6,721,371 B1 | 4/2004 | Barham et al. |
| 6,785,907 B1 | 8/2004 | Dan et al. |
| 6,973,271 B2 | 12/2005 | Farmer et al. |
| 7,039,432 B2 | 5/2006 | Strater et al. |
| 7,133,652 B2 | 11/2006 | Nast et al. |
| 7,162,731 B2 | 1/2007 | Reidhead et al. |
| 7,433,543 B2 | 10/2008 | Hagiwara |
| 7,530,091 B2 | 5/2009 | Vaughan |
| 7,580,693 B2 | 8/2009 | Rohde et al. |
| 7,631,337 B2 | 12/2009 | King et al. |
| 7,679,471 B2 | 3/2010 | Rijssemus et al. |
| 7,707,615 B2 | 4/2010 | Musser et al. |
| 7,742,777 B2 | 6/2010 | Strater et al. |
| 7,751,718 B2 | 7/2010 | Sage |
| 8,045,066 B2 | 10/2011 | Vorenkamp et al. |
| 8,401,387 B2 | 3/2013 | Biegert et al. |
| 8,415,422 B2 | 4/2013 | Schuetz et al. |
| 8,433,195 B2 | 4/2013 | Biegert et al. |
| 8,667,550 B2 | 3/2014 | Wang |
| 8,769,597 B2 | 7/2014 | Wang |
| 2001/0046268 A1 | 11/2001 | Sharma |
| 2002/0056135 A1 | 5/2002 | Sharma |
| 2002/0083476 A1 | 6/2002 | McNamara |
| 2003/0106067 A1 | 6/2003 | Hoskins et al. |
| 2003/0121056 A1 | 6/2003 | Sorenson et al. |
| 2004/0073953 A1 | 4/2004 | Xu et al. |
| 2005/0097154 A1 | 5/2005 | Tsecouras |
| 2006/0141976 A1 | 6/2006 | Rohde et al. |
| 2010/0017842 A1 | 1/2010 | Wells |
| 2010/0095344 A1 | 4/2010 | Newby et al. |
| 2010/0100918 A1 | 4/2010 | Egan, Jr. et al. |
| 2010/0125877 A1 | 5/2010 | Wells et al. |
| 2010/0146564 A1 | 6/2010 | Halik et al. |
| 2010/0266000 A1 | 10/2010 | Froimovich et al. |
| 2011/0140761 A1 | 6/2011 | Nagayama et al. |
| 2011/0154429 A1 | 6/2011 | Stantchev |
| 2011/0267143 A1 | 11/2011 | Zilberberg |
| 2012/0151548 A1 | 6/2012 | Rakib |
| 2014/0065949 A1* | 3/2014 | Wilhite .................. H04B 1/745 455/8 |

OTHER PUBLICATIONS

Jon-En Wang, "Service Provisioning Device With Integrated Cable Modem", U.S. Appl. No. 13/229,493, filed Sep. 9, 0211.

Kang Lin et al., "Return Path Noise Reducing Amplifier with Bypass Signal", U.S. Appl. No. 14/181,636, filed Feb. 15, 2014.

Jon-En Wang, "Amplifier With Noise Reduction", U.S. Appl. No. 14/283,005, filed May 20, 2014.

Krista Susan Jacobson, "Discrete Multi-Tone-Based Communications in the Reverse Channel of Hybrid Fiber-Coax Networks", Thesis, Stanford University, Aug. 1996, pp. 1-161.

Author Unknown, International Search Report and Written Opinion dated Jan. 31, 2014, PCT Application No. PCT/US2013/065468, 15 pages.

Extended European Search Report dated Sep. 9, 2016, European Application No. 13847977, filed Oct. 17, 2013, pp. 1-7.

* cited by examiner

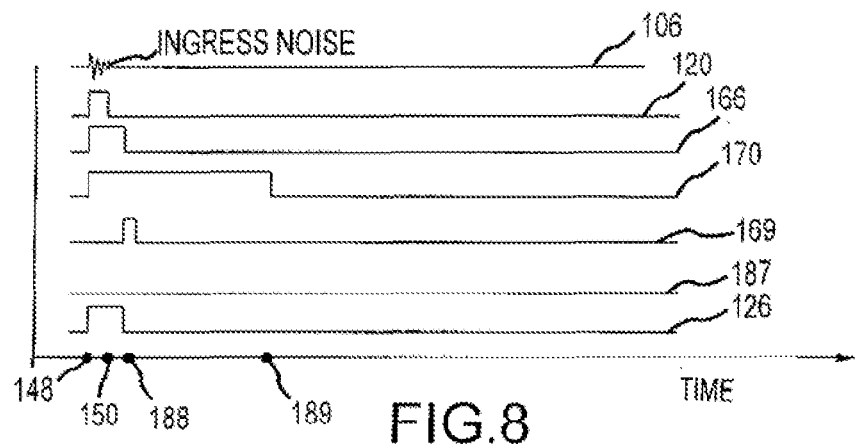
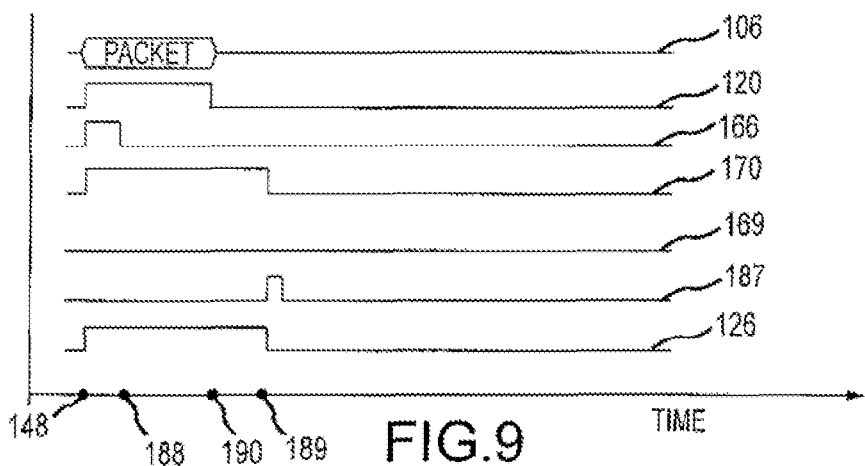
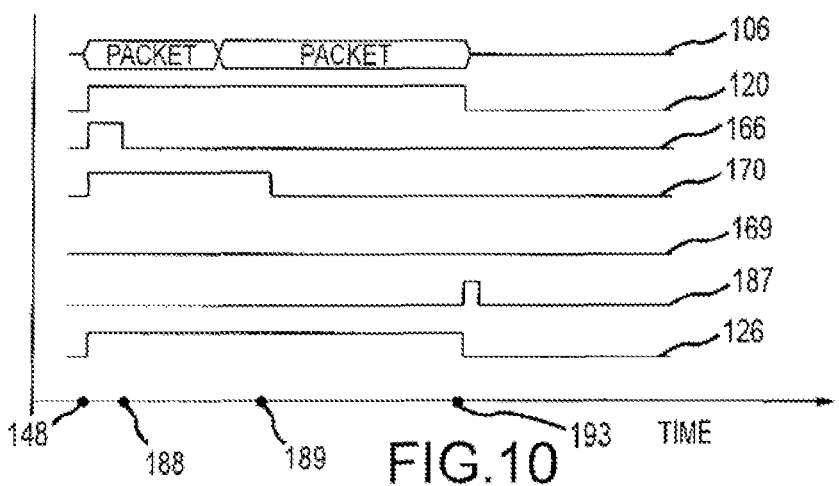

NETWORK INTERFACE DEVICE AND METHOD HAVING PASSIVE OPERATION MODE AND NOISE MANAGEMENT

PRIORITY CLAIM

This application is a divisional of U.S. patent application Ser. No. 14/056,566, filed Oct. 17, 2013, which is a non-provisional of, and claims the benefit and priority of, U.S. Provisional Patent Application Ser. No. 61/714,930, filed on Oct. 17, 2012.

INCORPORATION BY REFERENCE

The entire contents of the following applications are hereby incorporated by reference: (a) U.S. Provisional Patent Application Ser. No. 61/714,930, filed on Oct. 17, 2012; (b) U.S. patent application Ser. No. 13/969,064, filed on Aug. 16, 2013; (c) U.S. patent application Ser. No. 13/669,805, filed on Nov. 6, 2012; and (d) U.S. Provisional Patent Application Ser. No. 61/559,598, filed on Nov. 14, 2011.

CROSS REFERENCE TO RELATED APPLICATIONS

This application is related to the following commonly-owned, co-pending patent applications: (a) U.S. patent application Ser. No. 13/969,064, filed on Aug. 16, 2013; (b) U.S. patent application Ser. No. 13/669,805, filed on Nov. 6, 2012; and (c) U.S. Provisional Patent Application Ser. No. 61/559,598, filed on Nov. 14, 2011.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyrights whatsoever.

BACKGROUND

Cable television (CATV) networks supply high frequency "downstream" signals from a main signal distribution facility, known as a "headend," through the CATV network infrastructure, to the homes and offices of subscribers The downstream signals are supplied to the subscriber equipment, such as television sets, telephone sets and computers, to enable them to operate.

In addition, most CATV networks also transmit "upstream" signals from the subscriber equipment back to the headend of the CATV network. For example, a set top box enables the subscriber to select a TV program for display on the television set by transmitting the program selection to the CATV provider. Upstream signals are sent from the set top box to the headend signal-delivering equipment. This equipment responds by transmitting the selected downstream signal to the subscriber. As another example, two-way communication occurs when using a personal computer connected through the CATV infrastructure to the public Internet. As a further example, voice over Internet protocol (VOIP) telephone enabled devices use the CATV infrastructure and the public Internet as the medium for transmitting two-way telephone conversations. Such two-way signal transmission (upstream and downstream) is therefore an important feature for modern CATV networks.

Passive-active network interface devices have been developed to provide both passive and active, i.e. amplified, signals at the subscriber premises for the two different types of subscriber devices which operate from passive and active signals. Such passive-active network interface devices include a signal splitter which essentially divides or branches the incoming, or "downstream," signals from the cable network into passive and active branches. The passive branch downstream signals are conducted through a passive branch of the network interface device without amplification or modification and applied to those subscriber devices which require passive signals for operation, such as, for example, a voice modem for a telephone set. The active branch downstream signals are conducted to an active signal conditioner, such as an amplifier, of an active branch of the network interface device. The active signal conditioner amplifies the strength of the signals or modifies some characteristic of the signals before the amplified, or conditioned, signals are delivered to one or more subscriber devices. The amplified signals are applied to those subscriber devices that benefit from the amplified signals, such as a television sets and computers.

The known passive-active interface devices have several disadvantages. They include electromechanical, moving parts. The moving parts can cause higher instances of failure or require undesirable levels of repair and maintenance. Also, the complexity of the known passive-active interface devices is associated with a relatively high manufacturing cost which, in turn, leads to a higher price passed along to the users of cable network services.

The high-frequency signals conducted through the cable network are susceptible to distortion from a number of sources. It is for this reason that coaxial cables are widely used to shield the high-frequency signals from degrading influences of the ambient environment. One requirement for maintaining high-quality signal conduction in a coaxial cable is properly terminating the coaxial cable. An improper termination causes reflections of the incident signals back into the transmission path. The reflections cause degradation of the desired incident signals received by the subscriber. The degradations are exemplified by amplitude ripple, group delay ripple, latency, and other similar effects which distort or reduce the incident signals. The signal reflections cause the subscriber to experience a degraded quality of service, or in some cases the level of degradation may prevent the subscriber from receiving meaningful service.

Therefore, there is a need to overcome, or otherwise lessen the effects of, the disadvantages and shortcomings described above.

SUMMARY

The network interface device (NID), in one embodiment, is operable to connect subscriber equipment to a CATV network over which downstream signals in a first frequency band from a headend of the CATV network, are transmitted to the subscriber equipment. Valid upstream signals in a second different frequency band are transmitted from the subscriber equipment to the headend. The network interface device has an upstream noise mitigation circuit which mitigates ingress noise into the CATV network in the second frequency band. The network interface device also has a bypass circuit for lifeline preservation, including an upstream filter which filters upstream signals before delivery to the CATV network, and a bypass circuit is connected to the noise mitigation circuit. The bypass circuit includes a lifeline signal path, and the bypass circuit includes a relay. The relay switches the signal path between the noise mitigation circuit and the lifeline path. The relay switches to the lifeline path during a power-off condition.

In one embodiment, the NID includes a signal splitter that is operable to separate a downstream signal into a passive branch signal and/or an active branch signal. An active branch circuit transmits the active branch signal to an active subscriber device. An active branch circuit noise manager detects an upstream signal transmitted from the least one active subscriber device and establishes a signal path for the detected upstream signal through the active branch circuit. The NID also includes a passive branch circuit to transmit the passive branch signal to a passive subscriber device.

In another embodiment, an NID includes a signal splitter that separates a downstream signal into a passive branch signal and/or an active branch signal. An active branch circuit transmits the active branch signal to/from an active subscriber device. An active branch circuit noise manager detects an upstream signal transmitted from the least one active subscriber device and establishes a signal path for the detected upstream signal through the active branch circuit. A passive branch circuit transmits the passive branch signal to/from passive subscriber device. The NID also includes a switch (or bypass relay) operable to control transmission of signals to/from the active subscriber device.

In a further embodiment, an NID includes an input port used to communicate with a CATV network. A signal splitter separates a downstream signal into a passive branch signal and/or an active branch signal. The NID includes a gas tube surge protector located on a connection between the input port and the signal splitter. An active branch circuit transmits the active branch signal to/from an active subscriber device. An active branch circuit noise manager (or noise mitigation circuit) detects an upstream signal transmitted from the least one active subscriber device and establishes a signal path for the detected upstream signal through the active branch circuit. A passive branch circuit transmits the passive branch signal to/from passive subscriber device. A bypass circuit bypasses the signal path through the active branch circuit during a power-off condition.

In another embodiment, a noise mitigation circuit detects an upstream signal transmitted from an active subscriber device and establishes a signal path for the detected upstream signal through the active branch circuit.

Additional features and advantages of the present disclosure are described in, and will be apparent from, the following Brief Description of the Drawings and Detailed Description.

BRIEF DESCRIPTION OF THE DRAWINGS

FIGS. 8, 9 and 10 contain multiple waveform diagrams on a common time axis, illustrating the functional features of the upstream noise mitigation circuit shown in FIG. 7.

DETAILED DESCRIPTION

Part I

The infrastructure of a CATV network may include interconnected coaxial cables, signal splitters and combiners, repeating amplifiers, filters, trunk lines, cable taps, drop lines and other signal-conducting devices. The CATV network may be connected to a subscriber's home via a network interface device. This enables the subscriber's devices to communicate with the CATV network.

Figure 1:
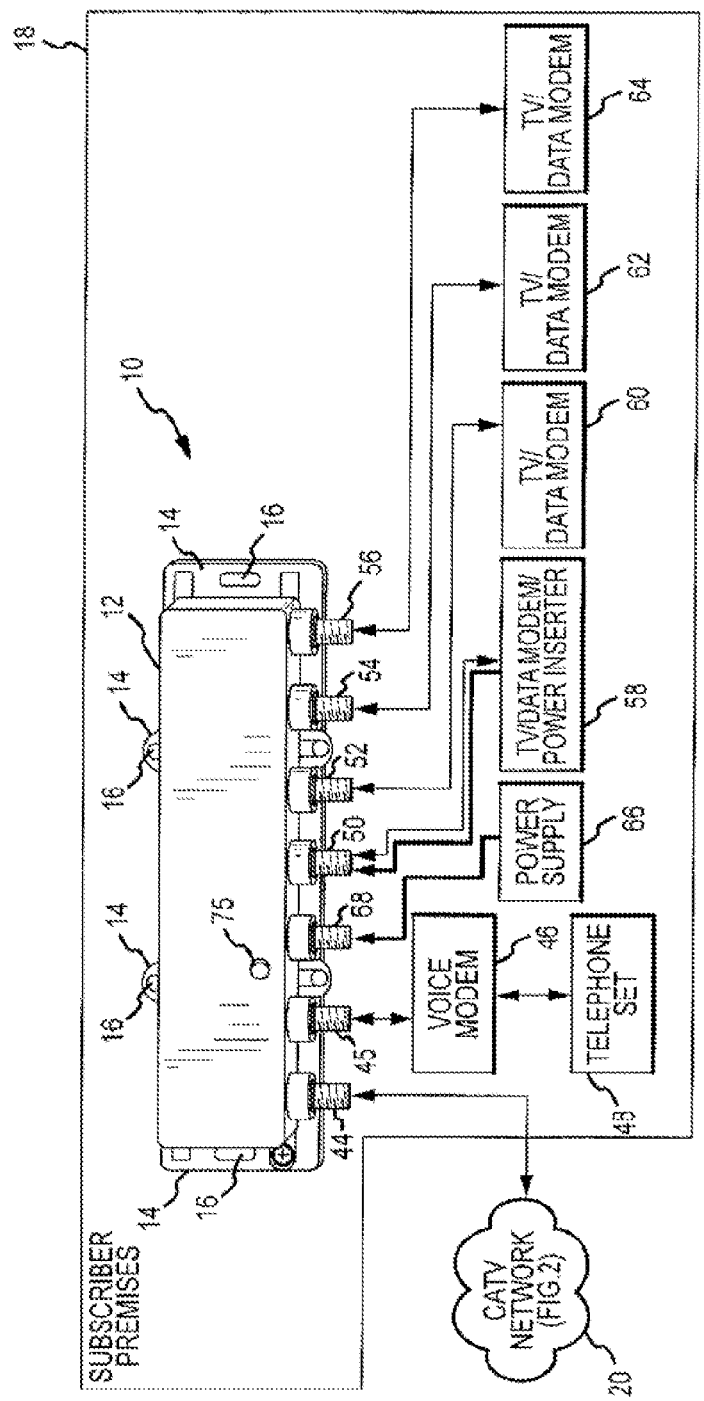
FIG. 1 is a perspective view of a network interface device which incorporates an embodiment and a block diagram of subscriber equipment shown connected to a CATV network through the network interface device located at a subscriber's premises.
Figure 3:
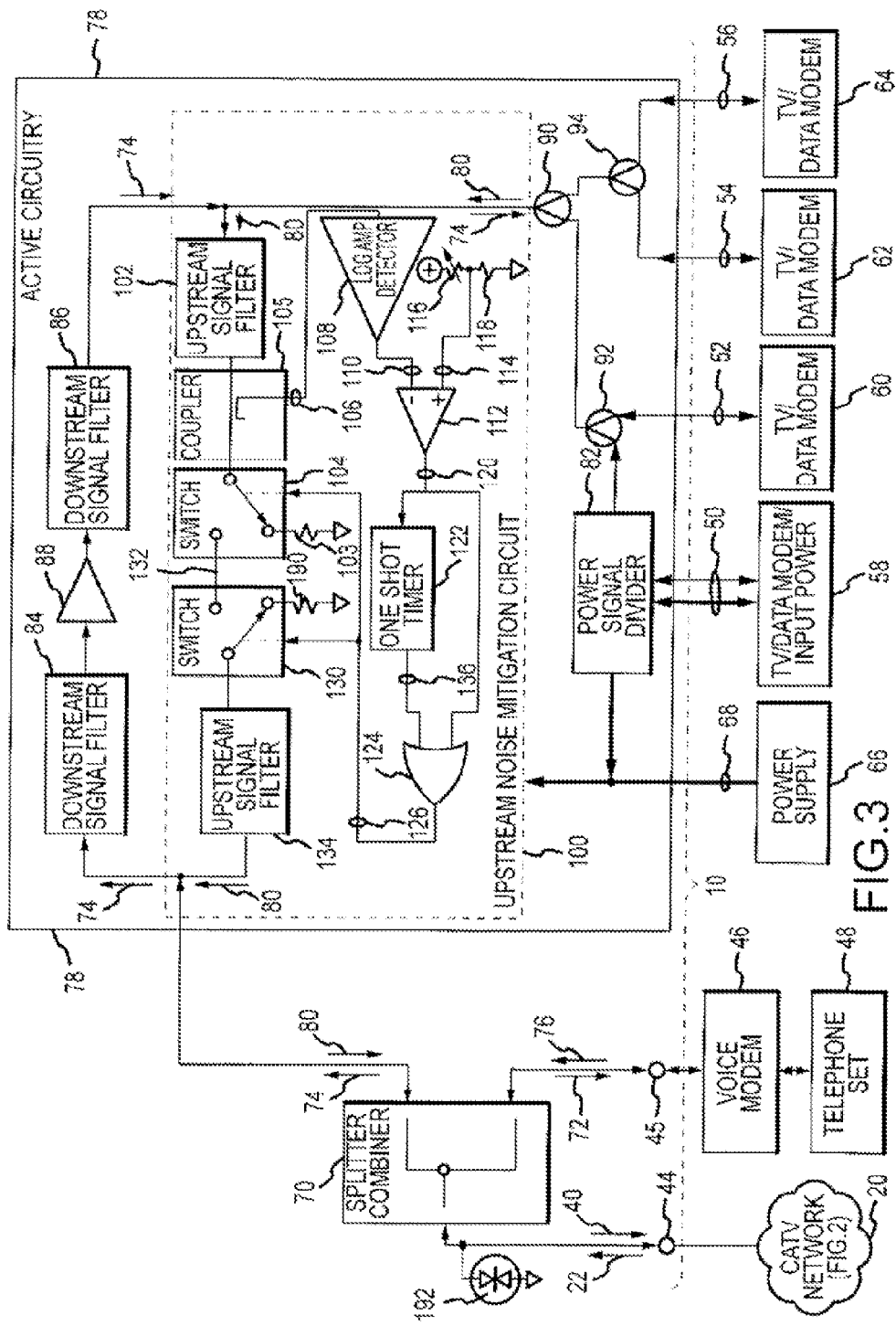
FIG. 3 is a block diagram of basic functional components within the network interface device shown in FIG. 1.
Figure 7:
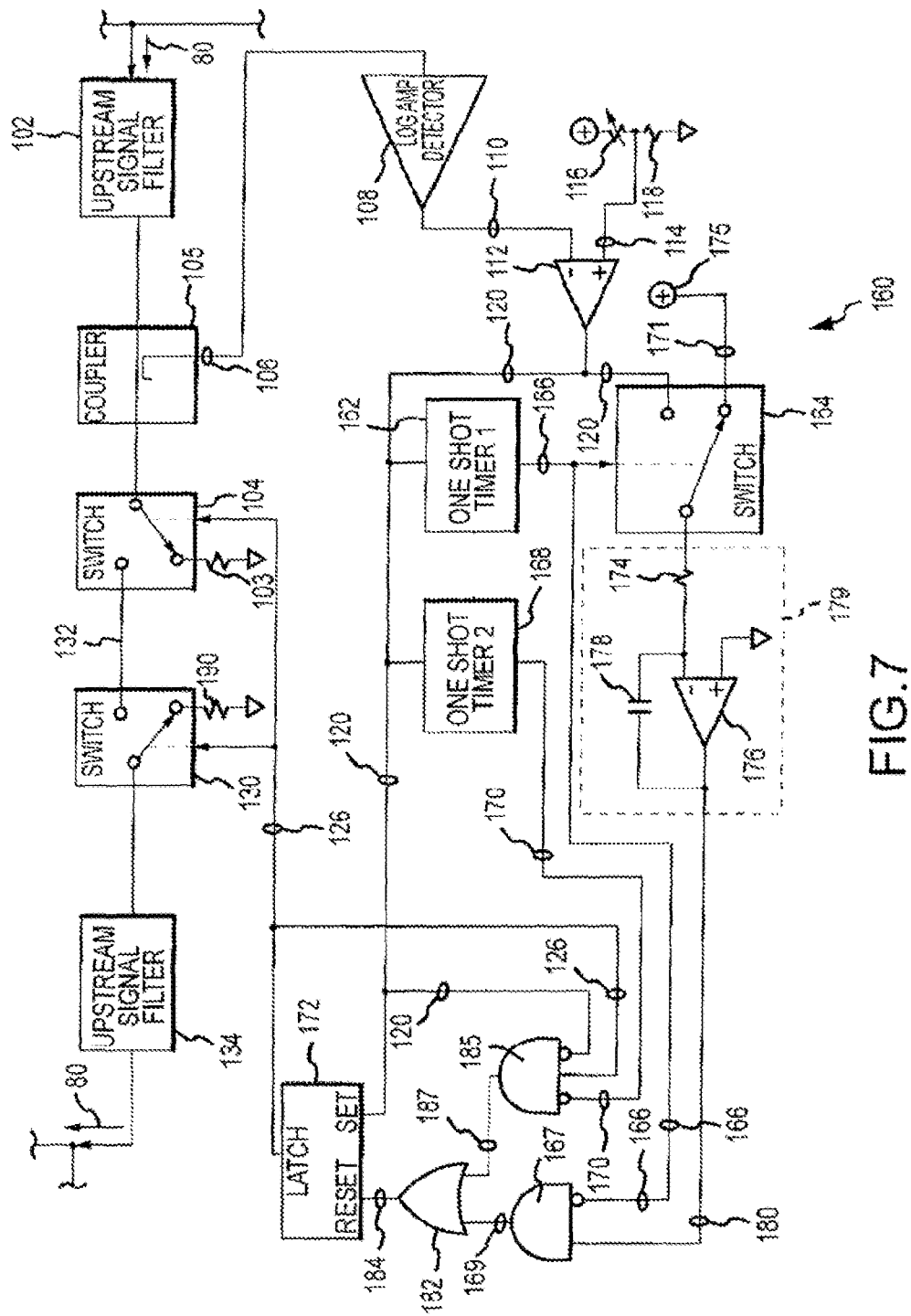
FIG. 7 is a block diagram of basic functional components of an upstream noise mitigation circuit which is an alternative to that shown in FIG. 3.

An NID or network interface device 10, which incorporates an embodiment, is shown in FIG. 1. The network interface device 10 includes a housing 12 which encloses internal electronic circuit components (such as shown in FIGS. 3 and 7). A mounting flange 14 surrounds the housing 12, and holes 16 in the flange 14 allow attachment of the interface device 10 to a support structure at a subscriber's premises 18.

Figure 2:
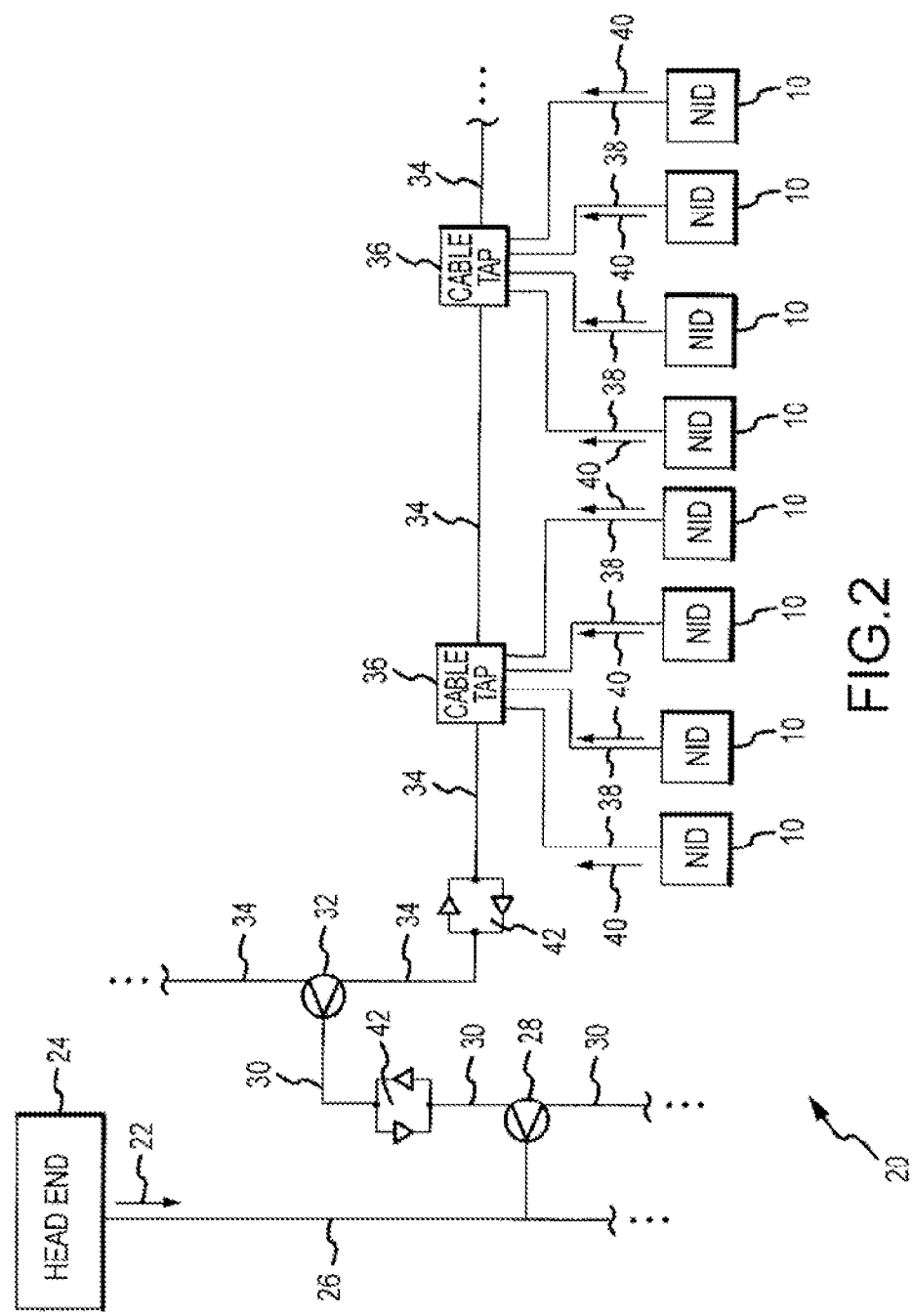
FIG. 2 is a block diagram of portions of a typical CATV network, with multiple network interface devices of the type shown in FIG. 1 connected by drop cables to cable taps, as well as other aspects of the CATV network.

The interface device 10 is connected to a CATV network 20, which is shown in a typical topology in FIG. 2. Downstream signals 22 originate from programming sources at a headend 24 of the CATV network 20, and are conducted to the interface device 10 in a sequential path through a main trunk cable 26, a signal splitter/combiner 28, secondary trunk cables 30, another signal splitter/combiner 32, distribution cable branches 34, cable taps 36, and drop cables 38. Upstream signals 40 are delivered from the network interface device 10 to the CATV network 20, and are conducted to the headend 24 in a reverse sequential path. Interspersed at appropriate locations within the topology of the CATV network 20 are conventional repeater amplifiers 42, which amplify both the downstream signals 22 and the upstream signals 40. Conventional repeater amplifiers may also be included in the cable taps 36. The cable taps 36 and signal splitter/combiners 28 and 32 divide a single input downstream signal into separate downstream signals, and combine multiple upstream signals into a single upstream signal.

The network interface device 10 receives the downstream signals 22 from the CATV network 20 at a network connection port 44. The downstream signals 22 are either passive or active. Passive downstream signals are those signals which are conducted through the interface device 10 without amplification, enhancement, modification or other substantial conditioning. The passive downstream signals are delivered from a passive port 45 to passive subscriber equipment, such as a voice modem 46 connected to a telephone set 48, or an embedded multimedia network interface device (EMTA, not shown), located at the subscriber premises 18. Active downstream signals are those signals which are amplified, filtered, modified, enhanced or otherwise conditioned by power-consuming active electronic circuit components within the interface device 10. The conditioned active downstream signals are divided into multiple copies and delivered from a plurality of active ports 50, 52, 54 and 56 to active subscriber equipment located at the subscriber premises 18, such as television (TV) sets and/or data modems 58, 60, 62 and 64. Other subscriber equipment, such as data processing devices or computers, is connected to the data modems.

The equipment at the subscriber premises 18 typically generates upstream signals 40 (FIG. 2) to the network interface device 10 for delivery to the CATV network 20. The upstream signals 40 may be either active or passive upstream signals generated by the subscriber equipment connected to the active and passive ports 45, 50, 52, 54 and 56. For example, one or more of the TV sets 58, 60, 62 and 64 may have conventional set top boxes (not shown) associated with them to allow the subscriber/viewer to make programming and viewing selections. Of course, any computers (not shown) connected to the data modems 58, 60, 62 and 64 typically communicate upstream signals. The telephone set 48 and the voice modem 46, or the EMTA (not shown); also generate upstream signals as a part of their typical functionality.

Electrical power for the network interface device 10 is supplied from a conventional DC power supply 66 connected to a dedicated power input port 68. Alternatively, electrical power can be supplied through a conventional power inserter (also shown at 58) that is connected to the port 50. The power inserter allows relatively low voltage DC power to be conducted through the same port 50 that also conducts high-frequency signals. Use of a conventional power inserter connected to one of the ports, e.g. port 50, eliminates the need for a separate dedicated power supply port 68, or provides an alternative port through which electrical power can also be applied. The power supply 66 or the power supplied from the port 50 is typically derived from a conventional wall outlet (not shown) within the subscriber premises 18.

The ports 44, 45, 50, 52, 54, 56 and 68 may be conventional female coaxial cable connectors which are mechanically connected to the housing 12 and which are electrically connected to internal components of the interface device 10. Coaxial cables from the subscriber equipment and the drop cables 38 (FIG. 2) are connected to the interface device 10 by mechanically connecting the corresponding mating male coaxial cable connector (not shown) on these coaxial cables to the female coaxial cable connectors forming the ports 44, 45, 50, 52, 54, 56 and 68.

The internal circuit components of one embodiment of the network interface device 10 are shown in FIG. 3. Those internal circuit components include a conventional bi-directional signal splitter/combiner 70 which separates the input downstream signals 22 from the CATV network 20 at the cable port 44 into passive downstream signals 72 and active downstream signals 74 within the network interface device 10. The passive downstream signals 72 are conducted directly through the passive port 45 to the passive subscriber equipment 46 and 48. Passive upstream signals 76 created by the passive subscriber equipment 46 and 48 are conducted through the passive port 45 directly to the signal splitter/combiner 70 to become upstream signals 40 in the CATV network 20. The direct signal conductivity path for the passive signals in the network interface device 10 avoids subjecting the passive signals to potentially adverse influences from electronic components that might fail or malfunction, thereby enhancing the reliability of the passive communications without increasing the risk of failure. Passive communications are intended to be as reliable as possible since they may be used in emergency and critical circumstances.

The active downstream signals 74 are conducted to active circuitry 78, where the active downstream signals 74 are amplified, filtered, modified, enhanced or otherwise conditioned before delivery through the active ports 50, 52, 54 and 56 to the subscriber equipment 58, 60, 62 and 64. Active upstream signals 80 are created by the subscriber equipment 58, 60, 62 and 64, and also pass through the active circuitry 78, where those signals are also conditioned or otherwise modified or enhanced before being combined at the signal splitter/combiner 70 to become network upstream signals 40 in the CATV network 20.

The circuit components of the active circuitry 78 receive power from the power supply 66 connected at port 68 or through the power inserter 58 (FIG. 1) connected at port 50. A power-signal divider 82 separates the high-frequency active downstream and upstream signals 74 and 80 at port 50 from the DC power at port 50. The divider 82 conducts the active signals 74 and 80 from and to high-frequency signal conductivity paths within the active circuitry 78, while simultaneously conducting the DC power to the active circuitry 78 for use by its electrical power consuming components. Electrical power from the dedicated power input port 68 is also conducted to the power consuming circuit components of the active circuitry 78.

The components of the active circuitry 78 which conduct the downstream active signals 74 include first and second analog downstream filters 84 and 86 that are connected in series by a linear amplifier 88. The downstream filters 84 and 86 filter the downstream signals 74 in the downstream 54-1000 MHz frequency band. The linear amplifier 88 amplifies, modifies or enhances the downstream signals 74, and in conjunction with the filters 84 and 86, conditions the downstream signals 74. The downstream signals 74 are thereafter connected through conventional signal splitter/combiners 90, 92 and 94 before those downstream signals 74 are delivered through the active ports 50, 52, 54 and 56 to the subscriber equipment 58, 60, 62 and 64.

The active upstream signals 80 created by the subscriber equipment 58, 60, 62 and 64 are conducted through the active ports 50, 52, 54 and 56 to an upstream noise mitigating circuit 100. The upstream noise mitigation circuit 100 transfers valid active upstream signals 80 from the subscriber equipment 58, 60, 62 and 64 through the network interface device 10 to the CATV network 20 as upstream signals 40. These functions are accomplished as described below.

Valid upstream signals from the subscriber equipment 58, 60, 62 and 64 are conducted through the signal splitter/combiners 92, 94 and 90 to become active upstream signals 80. The upstream signals 80 are applied to a first upstream signal bandpass filter 102. Because the downstream signal filter 86 passes signals only in the 54-1000 MHz band, valid upstream signals 80 in the frequency band of 5-42 MHz are blocked by the downstream signal filter 86 and diverted through the upstream signal filter 102. The first upstream signal filter 102 preferably passes signals in the valid upstream signal frequency range of 5-42 MHz. Typical ingress noise falls within most intensely within the frequency range of 0-15 MHz, so the first upstream filter 102 has the capability of removing ingress noise at the low frequencies in the range of 0-5 MHz. However, ingress noise in the range of 5-15 MHz will be conducted by the upstream signal filter 102.

To mitigate or prevent ingress noise upstream signals from entering the CATV network 20 from the network interface device 10, ingress noise signals conducted through the first upstream filter 102 are isolated by a first radio frequency (RF) single pole double throw (SPDT) electronic switch 104 and terminated to ground through a termination resistor 103. The termination resistor 103 is connected to one terminal of the first electronic switch 104. Signals from the first upstream signal filter 102 are conducted through a conventional directional coupler 105 to and through the switch 104 to the termination resistor 103 while the first electronic switch 104 is in a normal position, shown in FIG. 3. All signals conducted through the first upstream signal filter 102 are terminated through the termination resistor 103, and are thereby prevented from entering the CATV network 20, while the first switch 104 is in its normal position.

The first electronic switch 104 changes to an alternate activated position (not shown in FIG. 3) upon the instantaneous power of the signals conducted through the filter 102 reaching a magnitude indicative of a valid upstream signal from the subscriber equipment 58, 60, 62 or 64. To distinguish relatively low power ingress noise from the relatively higher power of a valid upstream signal, the instantaneous magnitude of the power of the signals passing through the upstream filter 102 is detected and evaluated. The coupler 105 delivers a signal 106 which is typically 10 dB lower in power than the signal passing through the coupler 105 to the switch 104.

The signal 106 from the coupler 105 is conducted to an input terminal of a conventional log amplifier detector 108. The log amplifier detector 108 operates on an inverse logarithmic basis to convert the instantaneous magnitude of power of the signal 106 to a DC voltage output signal 110. By operating on an inverse logarithmic basis, the typical decibel power of the input signal 106 is converted into a linear DC voltage output signal 110 whose magnitude is inversely related to the instantaneous input power. This logarithmic conversion allows the log amplifier detector 108 to function as an instantaneous demodulating power detector whose output DC voltage signal is inversely proportional to the logarithm of the input power. In one embodiment, the log amp detector 108 includes a commercially available component identified as part number AD 8319 available from Analog Devices of Norwood Mass., USA. The DC voltage output signal 110 therefore represents the inverse of the instantaneous power of the upstream signal 80 conducted through the directional coupler 105.

The DC voltage output signal 110 from the log amp detector 108 is applied to a negative input terminal of a comparator 112. A threshold signal 114 is applied to the positive input terminal of the comparator 112. The threshold signal 114 is derived from a resistor divider network such as a potentiometer 116 and a resistor 118 connected in series, or from another voltage source. Adjustment of the value of the potentiometer 116 adjusts the magnitude of the threshold signal 114. The adjustment of the threshold signal 114 establishes the level where a trigger signal 120 from the comparator 112 switches from a logic low level to a logic high level.

The magnitude of the DC voltage output signal 110 from the log amp detector 108 is inversely related to the magnitude of the instantaneous power of the upstream signal represented by signal 106. That is, when the magnitude of the upstream signal 106 is relatively large, the DC voltage output signal 110 from the log amp detector 108 is relatively small, and vice versa. Because of this inverse relationship, the DC voltage output signal 110 is applied to the negative input terminal of the comparator 112, and the threshold signal 114 is applied to the positive input terminal of the comparator 112. Applying the two input signals in this manner causes the comparator 112 to supply a logic high trigger signal 120 whenever the magnitude of the instantaneous power of the upstream signal exceeds a predetermined threshold power level representative of a valid upstream signal. Conversely, when the DC voltage output signal 110 is greater than the signal 114, the trigger signal 120 from the comparator 112 is at a logic low level. When the DC voltage output signal 110 is less than the signal 114, the trigger signal 120 from the comparator is at a logic high level. The logic high level of the signal 120 therefore represents the condition where the instantaneous power of the upstream signal exceeds the predetermined threshold power level established by the signal 114.

Upon sensing that the instantaneous power content of an upstream signal exceeds the level represented by the predetermined threshold power level, the upstream signal is automatically or immediately transmitted or passed to the CATV network 20 as a network upstream signal 40. Upstream signals which do not meet the threshold power level are considered ingress noise. Ingress noise signals are isolated from the CATV network 20 by the switches 104 and 130, while incident upstream signals 80 are simultaneously terminated to ground through the termination resistor 103. The functions of passing upstream signals to the CATV network and terminating upstream signals to ground are accomplished in response to the logic level of the trigger signal 120 from the comparator 112.

When instantaneous power content of an upstream signal exceeds the threshold power level, the resulting logic high signal 120 from the comparator 112 triggers a one-shot timer 122. Simultaneously, the logic high signal 120 is applied to an input terminal of an OR gate 124. The OR gate 124 responds by applying a logic high control signal 126 to the control terminals of the first SPDT RF electronic switch 104 and a second SPDT RF electronic switch 130. The electronic switches 104 and 130 normally occupy the positions shown in FIG. 3. Upon the assertion of logic high control signal 126, the switches 104 and 130 immediately change from their normal positions (shown in FIG. 3) to their opposite activated positions (not shown). The activated positions of the switches 104 and 130 establish a direct connection over conductor 132 between the switches 104 and 130. Since the electronic switches 104 and 130 switch with radio frequency speed, the switches 104 and 130 assume the activated position almost instantaneously in response to the assertion of the control signal 126.

The activated positions of the switches 104 and 130 conduct the upstream signal 80 from the first upstream signal filter 102 through the conductor 132 to a second upstream signal filter 134. Both filters 102 and 134 suppress frequencies other than those in the frequency band of 5-42 MHz. The valid upstream signal flows from the second upstream filter 134 through the signal splitter/combiner 70 into the cable network 20 as the network upstream signal 40. Terminating resistors 103 and 190 are connected to the filters 102 and 134 when the switches 104 and 130 are in their normal positions, and the filters 102 and 134 are connected together over the conductor 132 when the switches 104 and 130 are in their activated positions.

Valid upstream signals are conducted to the CATV network almost instantaneously when the instantaneous power level of the upstream signals exceeds the threshold power level. By responding almost instantaneously when the threshold power level is exceeded, the chances are minimized that the information contained in the valid upstream signal will be lost, as might be the case if the power of the upstream signal had to be integrated over a time period before a determination of a valid upstream signal could be made on the basis of energy content. Such integration raises the possibility that some of the information of the upstream signal will be lost and not transferred upstream. In contrast, no integration of the power of the upstream signal over a selected time period is required in the upstream noise mitigation circuit 100. By almost instantaneously transmitting upstream signals which have a power content that exceeds the predetermined threshold power level, the integrity of the information contained in the upstream signal is better preserved.

Once the switches 104 and 130 have been moved to the activated position which directly connects the first and second upstream signal filters 102 and 134 through the conductor 132, the switches 104 and 130 are maintained in this activated position for a time determined by the one-shot timer 122. When triggered by the logic high signal 120, the one-shot timer 122 immediately supplies a logic high output signal 136 to the OR gate 124. Either logic high signal 120 or 136 causes the OR gate 124 to supply the logic high control signal 126. If the power level of the upstream signal falls below the level of the threshold signal 114, the signal 120 immediately assumes a logic low level. However, the one-shot timer 122 will continue to deliver the logic high output signal 136 for the time duration of its internal time constant.

The internal time constant of the one-shot timer 122 is equal to the amount of time to transmit a single valid upstream signal packet of the maximum time duration permitted by the signaling protocol, plus a slight additional amount of time to account for inherent tolerances in the components and the timing of the one-shot timer 122. In this manner, the one-shot timer 122 ensures that the switches 104 and 130 assume their activated positions for a long enough time to conduct all single valid upstream signals, including a maximum-length valid upstream signal or packet.

Figure 4:
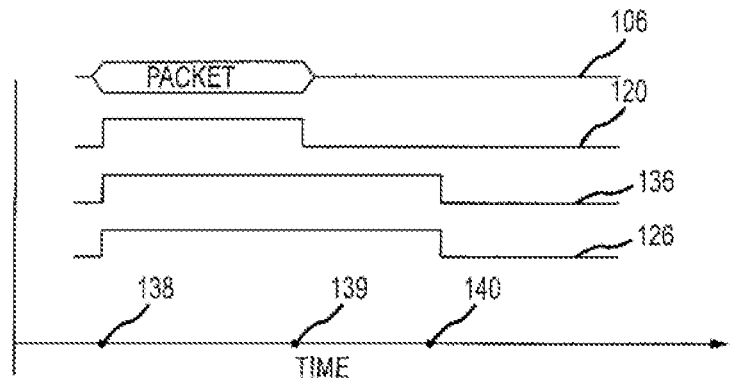
FIGS. 4, 5 and 6 contain multiple waveform diagrams on a common time axis, illustrating the functional features of an upstream noise mitigation circuit of the network interface device shown in FIG. 3.

The situation just described is illustrated by the waveform diagrams shown in FIG. 4, taken in connection with FIG. 3. The signal 106 represents a single valid upstream packet of the permitted maximum time duration whose detection by the log amp detector 108 produces the logic high trigger signal 120. The signal 120 assumes the logic high level at time point 138, triggering the one-shot timer 122 and causing the output signal 136 to be asserted at the same time point 138. The control signal 126 from the OR gate 124 immediately assumes a logic high level at time point 138. The electronic switches 104 and 130 assume their activated positions for the duration of the logic high control signal 126. At time point 139, the maximum time duration of a single valid upstream packet or signal ends, and the instantaneous power represented by that signal falls below the threshold power level represented by the threshold signal 114. The signal 120 assumes a logic low level. Since the time constant of one-shot timer 122 is established to slightly exceed the maximum time duration of a single valid upstream packet or signal, the logic high signal 136 will continue to time point 140. When the signal 136 assumes a logic low level after the one-shot timer 122 times out at time point 140, the control signal 126 from the OR gate 124 simultaneously assumes a logic low level. As a result, the control signal 126 is longer in duration than signal 120. When the control signal 126 assumes the low logic level at time point 140, the electronic switches 104 and 130 assume their normal positions to conduct any upstream signals to the termination resistor 103, thereby terminating those signals to ground and preventing the further upstream signals from reaching the CATV network.

For multiple valid upstream signal packets which are consecutively transmitted without a substantial time interval separating the multiple sequential upstream packets, the one-shot timer 122 will time out before the valid upstream signal transmission terminates. However, the continuous instantaneous power of the multiple sequential valid upstream signal packets will continue to exceed the threshold power level for the duration of the multiple sequential signal packets, thereby causing the comparator 112 to continue to assert the logic high trigger signal 120 to the OR gate 124 for the duration of the multiple sequential signal packets. The continued application of the logic high signal 120 causes the OR gate 124 to assert the logic high control signal 126 beyond the time when the one-shot timer 122 times out. The two upstream signal filters 102 and 134 remain connected by the switches 104 and 130 in their activated positions, and thereby conduct the multiple sequential upstream signal packets to assure that the full information represented by the multiple sequential signal packets is not truncated or lost by premature termination of those signals. At the termination of such multiple upstream signal packets, the signal power no longer exceeds the threshold signal 114, and the switches 104 and 130 immediately assume their normal positions, thereby preventing any ingress noise from entering the CATV network 20 after the longer or multiple sequential valid upstream packets have been transmitted.

Figure 5:
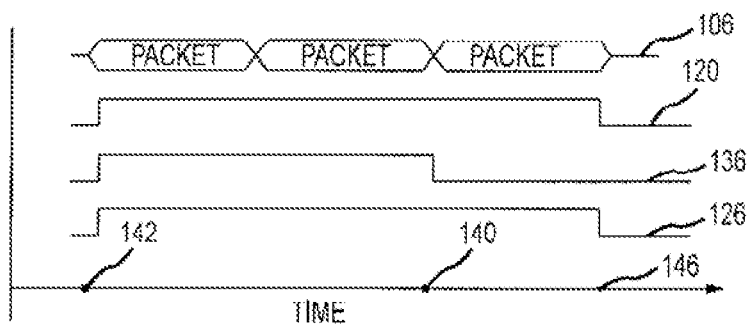

The situation just described is illustrated by the waveform diagrams shown in FIG. 5, taken in conjunction with FIG. 3. The signal 106 represents three, for example, sequential valid upstream packets or signals. The trigger signal 120 assumes the logic high level at time point 142 in response to recognizing the first of the sequential valid upstream packets. The one-shot timer 122 is triggered and causes the output signal 136 to be asserted at time point 142. The control signal 126 from the OR gate 124 also assumes a logic high level at time point 142 in response to the assertion of the control signal 136. The electronic switches 104 and 130 assume their activated positions in response to the logic high control signal 126. At time point 140, the one-shot timer 122 times out, causing its output signal 136 to assume a logic low level. However, the instantaneous power level from the multiple sequential upstream signal packets continues to exceed the threshold power level, until the sequence of multiple upstream signal packets terminates at time point 146. So long as the signal 120 is at a logic high level, the control signal 126 from the OR gate 124 causes the electronic switches 104 and 130 to remain in the activated position, conducting the multiple sequential valid upstream signal packets to the CATV network 20. Once the sequence of multiple valid upstream signal packets has been transmitted, which occurs at time point 146, the absence of any further valid upstream signal causes the instantaneous power level to fall below the threshold power level, and the signals 120 and 126 assume a logic low level. The electronic switches 104 and 130 respond by assuming their normal positions to prevent the further transmission of upstream signals to the CATV network.

If the instantaneous power of ingress noise exceeds the threshold power level, the electronic switches 104 and 130 assume their activated positions, as can be understood from FIG. 3. An unusually high and short duration power level of ingress noise can cause this situation. Under that circumstance, the trigger signal 120 assumes a logic high level, and the one-shot timer 136 is triggered and asserts the output signal 136. The electronic switches 104 and 130 assume their activated positions, allowing the ingress noise to pass through the upstream filters 102 and 134. Until the one-shot timer 122 times out, ingress noise will be allowed to enter the CATV network 20. The effect of this ingress noise is minimized by the time constant of the one-shot timer 122 extending only for the maximum time duration of the longest single valid upstream signal packet permitted under the communication protocol.

Figure 6:
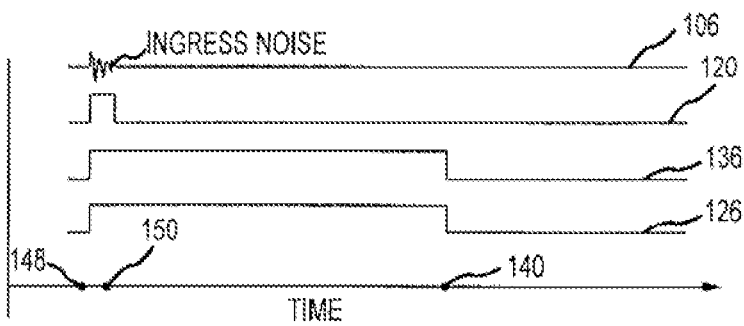

The response to ingress noise having instantaneous power that exceeds the threshold is illustrated by the waveform diagrams shown in FIG. 6, taken in connection with FIG. 3. The ingress noise signal is shown at 106. Because the instantaneous power of the ingress noise exceeds the threshold, a logic high trigger signal 120 is asserted from the comparator 112 at time point 148, thereby triggering the one-shot timer 122 and causing the signal 136 to be asserted at the same time point 148. The logic high signal 136 causes the OR gate 124 to assert the logic high control signal 126 at time point 148. The electronic switches 104 and 130 assume their activated positions for the duration of the high level of the control signal 126. At time point 150, the instantaneous power from the ingress noise falls below the threshold power level, causing the comparator 112 to assert a logic low trigger signal 120. However, the one-shot timer 122 has not timed out and continues to deliver the logic high signal 136 for the time duration of its time constant, until time point 140. The control signal 126 from the OR gate 124 transitions to a logic low level at time point 140 when the one-shot timer 122 times out, causing the electronic switches 104 and 130 (FIG. 3) to assume their normal positions. The electronic switch 104 connects the termination resistor 103 to terminate any further upstream signals to ground and thereby prevent any further transfer of upstream signals to the CATV network.

An alternative form 160 of the upstream noise mitigation circuit, shown in FIG. 7, reduces the amount of time that ingress noise may be conducted to the CATV network 20 after the initial instantaneous power of the ingress noise is sufficient to exceed the threshold power level, compared to the response of the circuit 100 (FIG. 3). The upstream noise mitigation circuit 160 shown in FIG. 7 includes many of the same components as the upstream noise mitigation circuit 100 (FIG. 3), and those same components function in the manner previously described.

In response to the instantaneous power of the ingress noise exceeding the threshold power level, represented by signal 114, the comparator 112 supplies the logic high trigger signal 120, in the manner previously described. The logic high trigger signal 120 is applied to a one-shot timer 162, to the input terminal of a SPDT RF electronic switch 164, to a second one-shot timer 168, and to the set terminal of a set-reset latch 172. In response to the logic high signal 120, the first one-shot timer 162 triggers and supplies an output signal 166. Simultaneously, the second one-shot timer 168 is triggered and supplies a signal 170. The latch 172 is immediately set in response to the logic high trigger signal 120 and supplies the control signal 126 to the RF electronic switches 104 and 130, causing them to switch to their activated positions and establish the upstream signal communication path for conducting upstream signals through the upstream signal filters 102 and 134. In this manner, the noise mitigation circuit 160 responds almost instantaneously to the instantaneous power of the upstream signal exceeding the threshold to immediately conduct the upstream signal to the CATV network without delay and without the risk of diminishing or losing some of the information contained in the upstream signal. In this regard, the upstream noise mitigation circuit 160 (FIG. 7) is similar in initial response to the upstream noise mitigation circuit 100 (FIG. 3). However, the upstream noise mitigation circuit 160 has the capability of more quickly closing the upstream communication path through the switches 104 and 130 when the upstream communication path was initially established in response to ingress noise.

The rapid closure of the upstream communication path in response to ingress noise is accomplished by integrating the signal 120 for a predetermined time established by the time constant of the one-shot timer 162. The logic high trigger signal 120 represents the power of the ingress noise exceeding the predetermined threshold power level. Integrating the logic high trigger signal 120 results in a value which represents energy above the threshold power level for the time duration of integration. Integration occurs over the time that the signal 166 is asserted by the one-shot timer 162. If the amount of power integrated during this time, i.e. energy, is not sufficient to confirm a valid upstream signal with continuous sustained instantaneous power, the switches 104 and 130 are moved to their normal positions, thereby terminating the upstream communication path. Since ingress noise generally does not contain significant sustained energy even though an initial burst of the ingress noise may have sufficient instantaneous power to exceed the threshold, the upstream communication path is quickly closed in a typical ingress noise situation.

Integrating the power represented by the threshold power level is accomplished by an integration circuit 179. The integration circuit 179 includes an operational amplifier 176. The positive input terminal of the operational amplifier 176 is connected to ground reference. A capacitor 178 is connected between the negative input terminal and the output terminal of the operational amplifier 176. The negative input terminal of the operational amplifier 176 is the input point for signals to the integration circuit 179.

Prior to commencement of integration, the switch 164 is in its normal position shown in FIG. 7. In the normal position of the switch 164, a positive voltage signal 171 is conducted from a power supply source 175 to a resistor 174 which is connected to the negative input terminal of an operational amplifier 176. Applying the positive voltage to the negative input terminal of the operational amplifier 176 has the effect of causing integration across the capacitor 178 to establish an output signal 180 at a voltage level near the ground reference. A voltage level near the ground reference constitutes a logic low signal. Thus, in the normal position of the switch 164, the output signal 180 from the integrator circuit 179 is at a logic low level.

In response to the control signal 166 moving the switch 164 from its normal position shown in FIG. 7 to its activated position which is the alternate of that position shown in FIG. 7, the logic high trigger signal 120 is applied through the resistor 174 to the negative input terminal of the operational amplifier 176. So long as the trigger signal 120 is at the logic high level, the output signal 180 from the operational amplifier 176 remains at a logic low level. However, because ingress noise typically has the effect of rapidly subsiding in instantaneous power, the instantaneous power will usually not exceed the threshold for a significant sustained amount of time, thereby causing the signal 120 to assume a logic low level during the time that the one-shot timer 162 supplies the control signal 166. Consequently, with the switch 164 in the activated position and the signal 120 at a logic low level, the operational amplifier 176 integrates this change of input signal level across the capacitor 178, which causes the output signal 180 to start increasing from the ground reference level. If the instantaneous power of the ingress noise remains low for a significant portion of the time that the one-shot timer 162 asserts the control signal 166, as is typical with ingress noise having an initial momentarily-high instantaneous power burst, the voltage across the capacitor 178 will increase to a level which corresponds to a logic high level of the signal 180.

The logic high output signal 180 is applied to one input terminal of an AND gate 167. The control signal 166 is applied to another input terminal of the AND gate 167. The input terminal to which the control signal 166 is applied is an inverting input terminal, thereby causing the AND gate 167 to respond to the inverted logic level of the control signal 166. The signal 180 remains at a logic high level for a time period after integration ceases from the integration circuit 179, and the control signal 166 assumes the logic low level at the end of the integration time established by the one-shot timer 162. At that point, the AND gate 167 responds to two logic high signals (the logic low signal 166 is inverted at the input terminal), resulting in a logic high level signal 169 applied to an OR gate 182. The OR gate 182 supplies a logic high level signal 184 to a reset terminal of the latch 176. The latch 176 resets, and de-asserts the control signal 126 to the switches 104 and 130, thereby closing the upstream communication path through the upstream filters 102 and 134. Thus, soon after the initial instantaneous power of the ingress signal diminishes and the integration time set by the one-shot timer 162 expires, the upstream communication path is closed to the further conduction of upstream signals, thereby preventing any further ingress noise from entering the CATV network.

During the time and situation just described, another AND gate 185 has no effect on the functionality. The signal 170 supplied by the one-shot timer 168 is asserted for a considerably longer period of time than the one-shot timer 162 asserts the control signal 166. The time of assertion of the signal 170 is the length of time, plus a margin for component tolerances, of the longest single valid upstream packet or signal permitted under the signal communication protocol. The time of integration represented by the assertion of the control signal 166 is considerably less than the longest single valid upstream packet. During the integration of the instantaneous power of the ingress noise over the time duration of the control signal 166, the output signal 170 is at a logic high level, the control signal 126 is at a logic high level because the latch 172 will have been set by the trigger signal 120, before the signal 120 assumes a logic low level after the initial high instantaneous power of the ingress noise has dissipated. The input terminals of the AND gate 185 to which the signals 120 and 170 are applied are inverting. Thus, under these conditions, the AND gate 185 supplies an output signal 187 at a logic low level.

The situation of terminating the upstream communication path created by a burst of ingress noise before expiration of the time duration of a maximum-length valid upstream signal or packet is illustrated by the waveform diagrams shown in FIG. 8, taken in connection with FIG. 7. The ingress noise signal is shown at 106. The instantaneous power of the ingress noise exceeds the threshold power level and causes a logic high trigger signal 120 from the comparator 112 at time point 148, thereby triggering the one-shot timers 162 and 168 and causing the control signals 166 and 170 to be asserted at the time point 148. The control signal 126 from the latch 172 also assumes a logic high level at time point 148 because the logic high trigger signal 120 sets the latch 172. The electronic switches 104 and 130 assume their activated positions for the duration of the logic high control signal 126 to maintain the upstream communication path. At time point 150, the instantaneous power of the ingress noise falls below the threshold power level, and the trigger signal 120 assumes a logic low level. However, the first one-shot timer 162 has not timed out and continues to deliver the control signal 166 until it times out at time point 188. The time duration between time points 148 and 188 is the time constant of the one-shot timer 162 which establishes the time duration of integration. The time for integrating a valid upstream signal is the time between time points 148 and 188.

If the integrated value indicates an upstream signal of unsustained instantaneous power, consistent with ingress noise that rapidly dissipates, the resulting logic high signal 180 from the integrator 179 is applied to the OR gate 182. The OR gate 182 supplies the logic high signal 180 at time point 188 which, when logically AND-ed with the logical inversion of signal 166, causes the AND gate 167 to assert the signal 169. The OR gate 182 responds by asserting a logic high signal 184, which resets the latch 172, thereby de-asserting the control signal 126. The upstream communication path is terminated when the switches 104 and 130 assume their normal positions.

As is understood from FIG. 8, the upstream communication path remains open from time point 148 to time point 188. This time is considerably less than the maximum time length of a single valid upstream packet or signal, represented by the time between points 148 and 189, or between time points 148 and 150 (FIG. 6). Consequently, even though the upstream communication path is immediately established to allow upstream signal communication whenever the instantaneous power exceeds the threshold, that upstream communication path is closed to further upstream communication very rapidly thereafter if spurious ingress noise established that communication path.

Whenever an upstream signal has sustained instantaneous power, the noise mitigation circuit 160 assures that the upstream signal will be conducted to the CATV network. Such circumstances indicate a valid upstream signal. As understood from FIG. 7, the trigger signal 120 is asserted at a logic high level when the valid upstream signal exceeds the threshold. The latch 172 is set and asserts the logic high control signal 126 which moves the switches 104 and 132 their activated positions to establish the upstream communication path. The timers 162 and 168 are triggered, and the one-shot timer 162 moves the switch 164 to its activated position. The output signal 180 remains at a logic low level during the time of a valid upstream signal while the one-shot timer 162 asserts the control signal 166 and while the logic high trigger signal 120 remains at a logic high level due to the sustained instantaneous power of the valid upstream signal exceeding the threshold. The logic low signal 180 and the inversion of the logic high signal 166 at the input terminal of the AND gate 167 causes the AND gate 167 to assert a logic low signal 169, which has no effect on the OR gate 182 or the latch 172. Thus, during the transmission of a valid upstream signal, the AND gate 167 has no effect on the status of the latch 172.

On the other hand, the time constant of the one-shot timer 168 is considerably longer than the time constant of the one-shot timer 162. The signal 170 from the timer 168 is asserted for the time duration of a single valid maximum-length upstream packet or signal. The logic high level of the signal 170 is inverted at the input terminal of the AND gate 185. At this time, the control signal 126 is at a logic high level because the latch 172 has been set. The continuous instantaneous power of the valid upstream signal is represented by a logic high level of the trigger signal 120. The logic high level of the signal 120 is inverted at the AND gate 185. The logic level of the signals applied to the AND gate 185 causes it to supply a logic low signal 187, which has no effect on the latch 172 during conditions of sustained instantaneous power from the valid upstream signal.

When the valid upstream signal terminates, the logic high level of the signal 120 changes to a logic low level. The logic low level signal 120 is inverted at its input terminal to the AND gate 185. The logic high signal 170 is still asserted by the one-shot timer 168, because the timer 168 times the duration of a single valid maximum-length upstream signal. Until the one-shot timer 168 de-asserts the signal 170, the AND gate 185 will not assert a logic high signal 187. However, when the signal 170 is de-asserted, the AND gate 185 applies the logic high signal 187 to the OR gate 182. The OR gate 182 asserts the signal 184 to reset the latch 172, and the control signal 126 is de-asserted. The switches 104 and 132 move to their normal positions and terminate the upstream communication path through the filters 102 and 134.

In response to sustained instantaneous power representative of a valid upstream signal, the noise mitigation circuit 160 assures that an upstream communication path will be established for the maximum time duration of a single valid upstream signal, provided that there is sufficient instantaneous energy in the upstream signal during the integration time established by the signal 166. In this manner, the circuit 160 is similar to the circuit 100 (FIG. 3) which assures that the upstream communication path remains established for the time duration of a single valid maximum-length upstream signal or packet. However, unlike the circuit 100 (FIG. 3) the circuit 160 discriminates between short-duration high instantaneous power ingress noise and continuous-duration high instantaneous power upstream signals and rapidly terminates the upstream communication path in response to the former.

The situation of maintaining the upstream communication path in response to sustained instantaneous energy of an upstream signal during the integration time established by the time constant of the one-shot timer 162, to allow adequate time for a single valid upstream packet of maximum duration to be transmitted, is illustrated by the waveform diagrams shown in FIG. 9, taken in connection with FIG. 7. The upstream signal is represented by a packet having a time duration less than the maximum allowed time duration for single valid upstream packet as shown at 106. The instantaneous power of the upstream packet 106 exceeds the threshold power level and causes a logic high trigger signal 120 from the comparator 112 at time point 148, thereby triggering the one-shot timers 162 and 168 and causing the control signals 166 and 170 to be asserted at the same time point 148. The control signal 126 from the latch 172 also assumes a logic high level at time point 148 due to the assertion of the logic high signal 120. The electronic switches 104 and 130 assume their activated positions for the duration of the logic high signal 126 and establish the upstream communication path. At time point 188, the first one-shot timer 162 times out and de-asserts the control signal 166. The time duration between time points 148 and 188 establishes the time duration of integration.

During the time of integration, the instantaneous power of the single packet 106 continuously exceeds the threshold level. Consequently, the output signal 180 from the integration circuit 179 remains at a logic low level, and the inversion of the control signal 166 at the AND gate 167 maintains the output signal 169 in a logic low level. At time point 188 when the one-shot timer 162 times out, the control signal 166 assumes a logic low level, but the inversion of that logic low level at the input terminal to the AND gate 167, coupled with the continuous logic low level signal 180 continues to maintain the output signal 169 at a logic low level. The logic low signal 169 does not change for the duration of the situation shown in FIG. 9. As a result, the AND gate 167 has no effect on resetting the latch 172 in this situation.

During the time between points 148 and 188, the logic high control signal 126, the logic high trigger signal 120, which is inverted at its input terminal to the AND gate 185, and the logic high control signal 170, which is also inverted at its input terminal to the AND gate 185, cause the output signal 187 from the AND gate 185 to remain at a logic low level. Therefore, during this time between points 148 and 188, the signal 187 from the AND gate 185 has no effect on resetting the latch 172.

At time point 190 the packet 106 terminates. The instantaneous power associated with the packet 106 also terminates, causing the trigger signal 120 to achieve a logic low level. However, the one-shot timer 168 has not yet timed out, so its output signal 170 remains at a logic high level until time point 189. The logic low level trigger signal 120 does not change the state of the AND gate 185. Consequently, the latch with 172 remains set at time point 190.

When the one-shot timer 168 times out, at point 189, the control signal 170 assumes a low logic level. The low logic signal 170 is inverted at its input terminal to the AND gate 185. The trigger signal 120 previously assumed a logic low level at time point 190. The inversion of the signals 120 and 170 at the input terminals to the AND gate 185 results in three logic high input signals to the AND gate 185, causing the output signal 187 to assume a logic high level. The logic high signal 187 is applied to the OR gate 182, and the output signal 184 from the OR gate resets the latch 172. Upon reset, the latch 172 de-asserts the control signal 126 at time point 189, thereby closing the upstream communication path through the filters 102 and 134 as a result of the switches 104 and 130 assuming their normal positions.

Thus, as is understood from FIG. 9, a valid upstream signal of any duration will exceed the minimum power threshold measured during the integration time established by the one-shot timer 162, and as a consequence, the latch 172 will continue to assert the control signal 126 and maintain the upstream communication path through the filters 102 and 104. The upstream communication path will be maintained for the duration of the time constant of the one-shot timer 168, during which its output signal 170 is asserted at a logic high level. By maintaining the upstream communication path during the time that the one-shot timer 168 asserts the control signal 170, it is assured that all valid upstream signals having a time length at least equal to the maximum length of a single valid upstream signal will pass through the upstream communication path. Consequently, none of the information contained in a single valid upstream packet will be lost or truncated.

The upstream signal communication path remains established during the time between the actual end of the valid upstream packet and the end of a maximum-length valid upstream packet, represented by the difference in time between points 190 and 189, but that amount of time is relatively short and maintenance of the upstream communication path during this time assures that a valid upstream signal packet of any length up to the maximum length will be transmitted without loss or truncation of any of its information.

In addition to the previously described advantages of quickly closing the upstream communication path after it was established by ingress noise and of establishing the upstream communication path for the maximum length of a valid upstream signal, the noise mitigation circuit 160 also has the capability of transmitting multiple sequential valid data packets, without loss or truncation of information. This situation can be understood by reference to FIG. 10, taken in conjunction with FIG. 7.

The first valid upstream packet of the sequence of multiple valid upstream packets, shown at 106 in FIG. 10, establishes the upstream communication path due to its sustained instantaneous energy. This energy is sustained during the integration time established by the one-shot timer 162. The control signal 166 is asserted at a high logic level until time point 188, and the control signal 170 is asserted at a high logic level until time point 189.

The instantaneous power of the sequence of multiple valid upstream packets remains above the threshold level and the trigger signal 120 remains asserted at a logic high level for the duration of that sequence of packets until time point 193, when the instantaneous power of the multiple sequential upstream packets terminates. The one-shot timer 168 does not time out until time point 189, at which point its output signal 170 assumes a logic low level at time point 189. The low logic level of the control signal 170 is inverted at its input terminal to the AND gate 185. However, at time point 189, the states of the input signals to the AND gate 185 result in the AND gate 185 supplying a logic low output signal 187. The logic low output signal 187 has no effect on the OR gate 182 and the latch 172 remains set.

At time point 193, the instantaneous power of the sequence of multiple valid upstream packets 106 falls below the threshold, causing the trigger signal 120 to assume a logic low level. The logic low level of the signal 120 at time point 193 is inverted at its input terminal to the AND gate 185, causing the AND gate to assert a logic high output signal 187. The logic high signal 187 causes the OR gate 182 to assert the signal 184, thereby resetting the latch 172 and de-asserting the signal 126. The switches 104 and 130 assume their normal positions, thereby terminating the communication path through the upstream signal filters 102 and 134.

In this manner, the upstream communication path is maintained for the duration of the multiple sequential packets, represented by the time between points 148 and 193. However, after the last packet in the multiple sequential series of valid upstream packets ends, the upstream communication path is closed to the further transmission of upstream signals, thereby preventing ingress noise from entering the CATV network.

As has been described in conjunction with FIGS. 7-10, any upstream signal, whether a valid upstream signal or ingress noise, which has sufficient instantaneous power to exceed the threshold will immediately open the upstream communication path through the filters 102 and 134. In this sense, the noise mitigation circuit 160 does not distinguish between a valid upstream signals and invalid ingress noise which may have sufficient energy to exceed the threshold. Not distinguishing between these signals assures that there is no delay in transmitting valid upstream signals. A delay in transmitting valid upstream signals could lose or truncate part of the information contained in those valid signals. However, once the upstream communication path has been established, the sustained instantaneous power of the upstream signal is integrated during the integration time established by the one-shot timer 162, between time points 148 and 188. If the instantaneous power of the upstream signal is not sustained, as is the typical case with ingress noise, the upstream communication path is terminated thereafter at time point 188.

On the other hand, if the instantaneous power of the upstream signal is sustained during the integration time, as may be the case with a valid upstream signal of any duration, the upstream communication path is maintained for the maximum duration of a single valid upstream signal or packet, represented by the time between points 148 and 189. In this manner, an upstream communication path is assured for the time duration necessary to transmit a single valid upstream packet of maximum time duration established by the communication protocol. Again, no loss or truncation of information of any valid upstream packet is assured. Similarly, there is no loss or truncation of the information contained in a sequence of multiple valid upstream packets, even when the multiple sequential upstream packets have a time duration which exceeds the maximum time duration of a single valid upstream packet. The upstream communication path remains open for the duration of the multiple sequential upstream packets, represented by the time between points 148 and 193. However as soon as the instantaneous power represented by the multiple upstream sequential packets falls below the threshold, at time point 193, the upstream communication path is terminated to prevent any ingress noise from entering the CATV network at the conclusion of the multiple sequential upstream packets.

Figure 11:
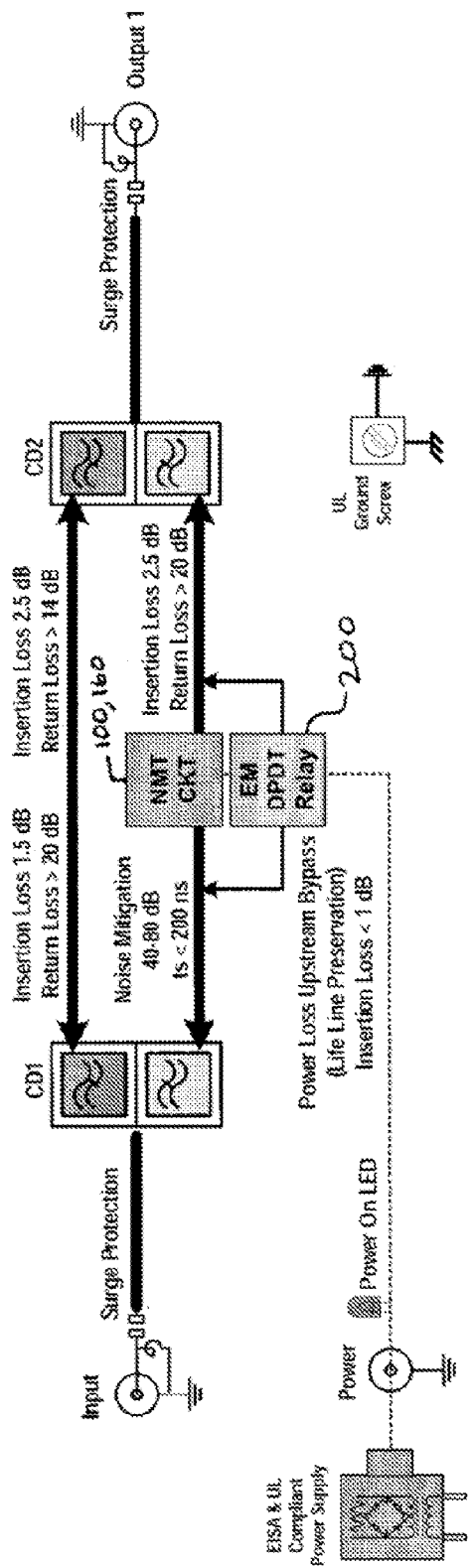
FIG. 11 depicts a block diagram of an embodiment of a power loss bypass circuit.

Now referring to FIG. 11, the CATV network interface device 10 may include a bypass circuit 200 to create a passive closed circuit during power loss conditions where the noise mitigation circuit 100, 160, having active circuitry, may create an open. The bypass circuit 200 provides for continuous and reliable use in emergency and critical circumstances, also known as lifeline preservation. During power loss conditions, use of cable modems, VoIP adapters, and E-MTAs may be unavailable where transmission of signal must pass through active circuitry. A bypass circuit 200 switches the signal path to pass only through passive circuitry.

Figure 12:
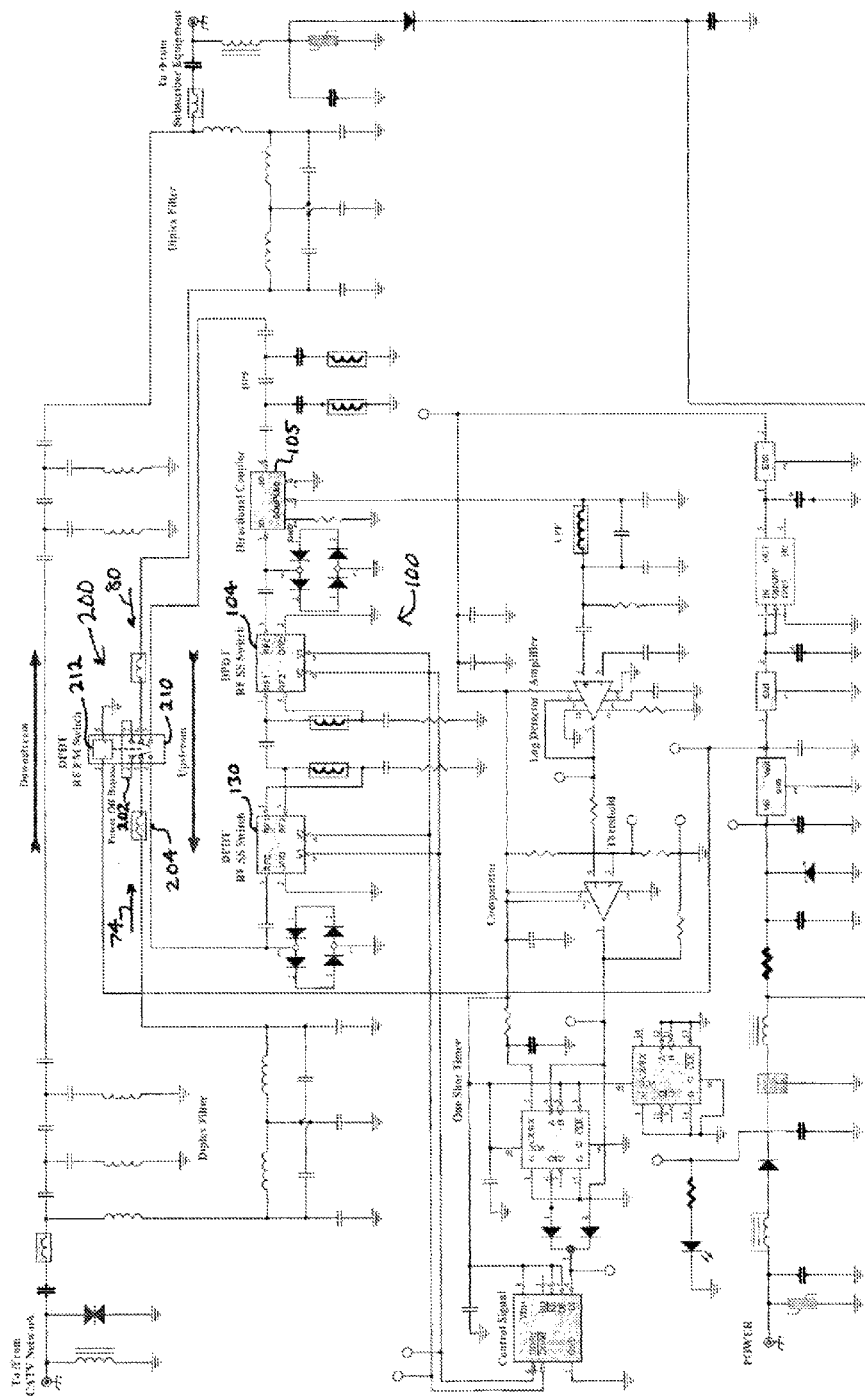
FIG. 12 depicts a circuit layout of the power loss bypass circuit shown in FIG. 11.

With continued reference to the figures, FIG. 12 illustrates one embodiment of the bypass circuit 200 as it may be integrated within a CATV network interface device 10. The bypass circuit 200 may include an electro-mechanical double-pole double-throw (EM DPDT) relay 210. The EM DPDT relay 210 switches between two signal paths, the noise mitigation path 204 and the lifeline path 202. The noise mitigation path 204 is described in detail with reference to FIGS. 1-10. The lifeline path 202 bypasses the noise mitigation path 204 to exclude active circuitry from the signal path, whether downstream signals 74 or upstream signals 80.

The EM DPDT relay 210 includes a control circuit 212. The control circuit 212 switches the signal paths between the lifeline path 202 and the noise mitigation path 204 depending on whether the EM DPDT relay 210 is energized or de-energized. For example, during power off conditions, the EM DPDT relay 210 is in the de-energized state, so the control circuit 212 switches the signal path to the lifeline path 202, as shown in FIG. 12. During the energized state, when power is on, the control circuit 212 switches the signal path to the noise mitigation path 204.

In the illustrated embodiment, the EM DPDT relay 210 is an 8-pin relay. The 8-pins are arranged in such a way that during the power-off condition, pins 2, 3, 6, and 7 have continuity, activating the lifeline path 202. In the power-on condition, pins 3, 4, 5, and 6 have continuity, activating the noise mitigation path 204.

The benefit of the termination resistors 103 and 190 is their ability to avoid signal reflections, as understood from FIGS. 3 and 7. The proclivity for high-frequency signals to reflect is related to the impedance characteristic of the termination of the conductor which conducts those signals and to the frequency of those signals, as is well known. For this reason, coaxial cables are typically terminated by connecting a terminating impedance between the signal-carrying center conductor and the surrounding reference plane shielding. The terminating impedance value should have a value equal to a characteristic impedance between the signal-carrying conductor and the reference plane shielding, to minimize signal reflections.

The values of the termination resistors 103 and 190 are selected to equal the characteristic impedance of the coaxial cables which form the drop cables 38 (FIG. 2), and that value is typically 75 ohms. Matching the value of the termination resistors 103 and 190 to the characteristic impedance of the coaxial cables minimizes the amount of signal reflection. Reflected signals combine with the incident downstream signals and cancel or degrade the downstream signals. Minimizing the signal reflection maximizes the quality and fidelity of the downstream signals and enhances the quality of service provided from the CATV network.

A further feature is the incorporation of a gas tube surge protection device 192 in the network interface device 10, as shown in FIG. 3. The gas tube surge protection device 192 (FIG. 3) is an integral component and is permanently enclosed within the housing 12 (FIG. 1). The gas tube surge protection device 192 provides protection against destruction of and damage to the components of the interface device 10 which typically might arise from lightning strikes to the CATV network 20 or from other unanticipated high voltage and high current applications to the CATV network. Because the infrastructure of the CATV network extends over a considerable geographical area, a lightning strike or other unexpected high voltage, high current application may adversely affect or destroy electronic components in the CATV network infrastructure, including the interface devices 10. For this reason, industry standards recommend some form of surge protection.

The typical previous types of surge protectors are inductor-capacitor circuits, metal oxide varistors, and avalanche diodes. These devices may be made a part of a network interface device, or these devices are included in cable taps 36 (FIG. 2). Inductor-capacitor circuits, metal oxide varistors and avalanche diodes only offer effective protection against relatively lower voltage and lower current surges. Inductor-capacitor circuits, metal oxide varistors and avalanche diodes are susceptible to failure in response to higher voltage and higher current surges, such as those arising from lightning strikes. Of course, the failure of such devices eliminates any protection and usually leads to failure of the components within the CATV network and within the network interface device. The CATV service provider may replace failed network interface devices, but a failed surge protector may not be recognized until after the destruction of other components has occurred.

Grounding blocks are another previous form of surge protection. Grounding blocks are devices used in cable taps 36 (FIG. 2), and include conductors which provide a common ground reference among the various devices within the cable taps 36. Grounding blocks may also be used in connection with a gas tube surge protection device within the cable taps 36, but gas tube surge protection devices are not commonly used with grounding blocks because of the relative expense associated with such devices and the perceived satisfactory protection available from the common grounding connection. Another disadvantage of using a gas tube surge protection device with a grounding block is that the arrangement is not fully effective. The gas tube surge protection device may be located at the cable taps 36 (FIG. 2), but the cable taps 36 are separated by drop cables 38 from the network interface devices 10. A lightning strike or other surge condition unexpectedly applied to one of the drop cables 38 will be conducted directly to the interface device 10 which may have no surge protection, as well as to the cable tap 36. Any protection provided by the grounding block, whether or not it includes a gas tube surge protection device, is assuredly not available to the network interface device 10, because the adverse surge can be conducted directly to the network interface device 10 and avoid the gas tube surge protection device in the cable tap 36.

Incorporating the gas tube surge protection device 192 in the network interface device 10, as shown in FIG. 3, offers a greater capability to protect against higher voltage and higher current surges and against repeated surges. The gas tube surge protection device 192 remains functional in response to higher voltage and higher current surges than can be responded to by inductor-capacitor circuits, metal oxide varistors and avalanche diodes. The gas tube surge protection device 192 also offers a capability to resist a greater number of multiple surges compared to other known previous devices. While the previous devices may respond to a moderate number of moderate level surges, the number of such responses is limited. After that number is exceeded, such previous devices tend to fail even in response to moderate surge conditions.

Locating the gas tube surge protection device 192 in the network interface device 10 provides the best level of protection against high voltage and high current surges arising within the CATV network infrastructure and arising from active and passive subscriber equipment connected to the network interface device 10. Downstream surges will be suppressed as they enter the network interface device 10 from the CATV network infrastructure. Even though it is unlikely that a surge condition will originate at the subscriber equipment connected to the interface device 10, the gas tube surge protection device 192 will provide protection for the other components within the CATV network 20 from upstream surges.

Incorporating the gas tube surge protection device 192 in the network interface device 10 also offers economic advantages, which are translated into a lower cost to the CATV service provider. The increased cost arising from incorporating the gas tube surge protection device 192 in the network interface device 10 is more than offset by avoiding the necessity to occasionally replace entire failed network interface devices and/or other components within the CATV network infrastructure.

As described above, there are numerous advantages and improvements available from an embodiment. The upstream noise mitigation circuits (100 and 160, FIGS. 3 and 7) respond to the instantaneous power of upstream signals. When the instantaneous power exceeds a predetermined threshold, a signal path for conducting the upstream signal to the CATV network is immediately established. Establishing the upstream communication path immediately when the instantaneous power of the upstream signal exceeds the threshold substantially reduces or diminishes the risk that information contained in the upstream signal will be lost, truncated or diminished. The risk of truncating or losing information in the upstream signal is considerably reduced or diminished compared to devices which integrate the power of the upstream signal over a time period before establishing the upstream communication path. By responding to the instantaneous power, the information in valid upstream signals is preserved. On the other hand, the upstream noise mitigation circuits 100 and 160 (FIGS. 3 and 7) offer the capability of quickly isolating and terminating the upstream communication path and thereby minimizing the ingress noise entering the CATV network.

In addition, the incorporation of the gas tube surge protection device within the network interface device itself offers substantial protective and economic advantages over the previous known uses of surge protection devices for CATV networks.

Part II

Figure 13:
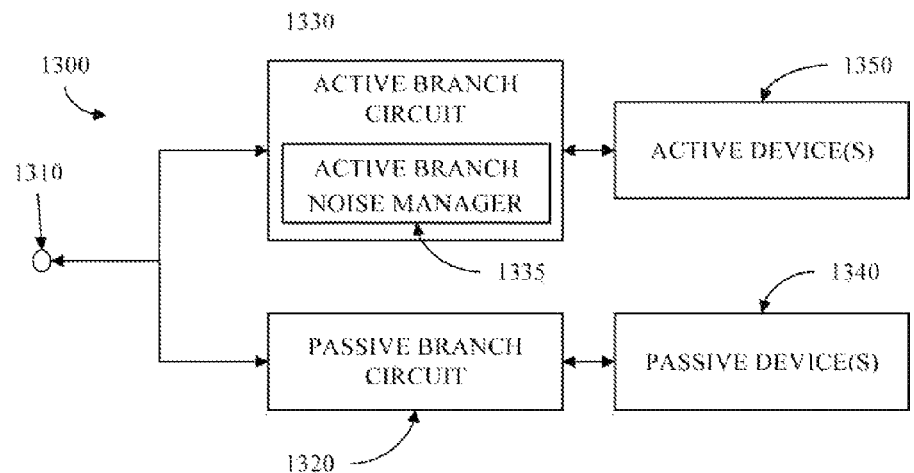
FIG. 13 depicts a block diagram of an embodiment of basic functional components within a network interface device.

FIG. 13 depicts a block diagram of an embodiment of basic functional components within a network interface device or NID 1300. An input 1310 receives a signal which is sent to active device(s) 1350 via the active branch circuit 1330 or to passive device(s) 1340 via passive branch circuit 1320. Within the active branch circuit 1330, the noise manager 1335 operates to mitigate ingress noise by selectively establishing an upstream path based on the detection and evaluation of upstream signals.

Figure 14:
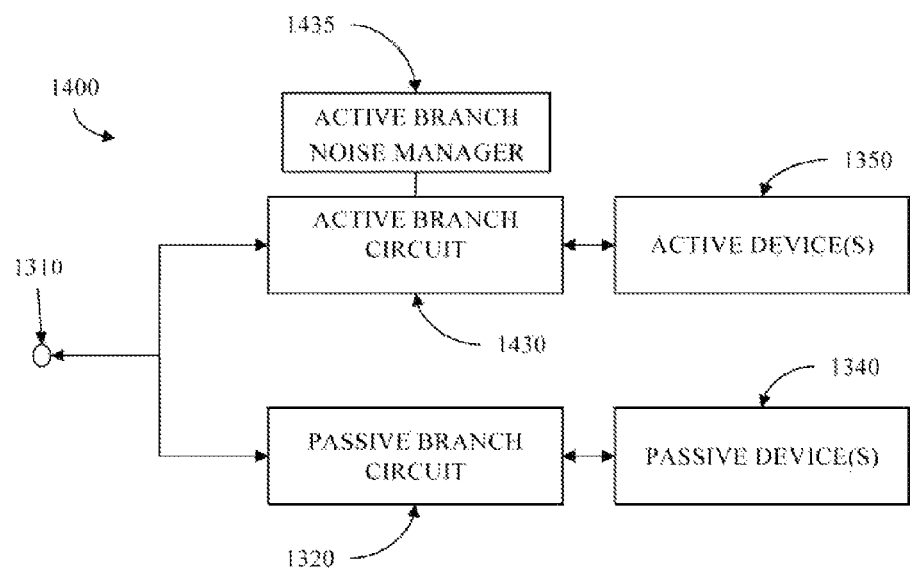
FIG. 14 depicts a block diagram of another embodiment of basic functional components within a network interface device.

FIG. 14 depicts a block diagram of another embodiment of basic functional components within a network interface device or NID 1400. The active branch circuit 1430 is controlled by or coupled to a separate noise manager 1435.

In one embodiment, each of the noise managers or noise management devices 1335 and 1435 is a low loss, broadband CATV/MoCA compatible, noise mitigation device. The NID having the noise manager may be used nearly anywhere in the home cable network, for example, it may be installed at the entry point of the home for the CATV signals. The noise manager mitigates (for example, by blocking) the in-band noise of the return (upstream) communication path when there is no active or valid communication transmitting. This noise reduction (such as, by isolation) translates to significantly greater nodal network signal to noise ratios (SNR). Additionally, the higher SNR may lead to a reduction in the transmitted power requirement at the Cable Modem which further reduces circuit nonlinearities such as; harmonics, beats, and spurs generated by nonlinear passives and actives in the network path. The result is an overall quality improvement for the end users as well as a reduction in maintenance or repair service calls.

Additionally, the use of a power loss bypass circuit with the noise manager 1335 or 1435 may be employed on the active branches of network interface devices where some means of power loss or return loss preservation may already be employed. In addition, a bypass may be employed for the sake of versatility of use so the noise manager 1335 or 1435 may instead be employed on the passive VOIP branch. This can be useful for all-in-one gateway architecture master device ports, which have increased needs for noise reduction while continuing the need for uninterrupted VOIP lifeline services.

In one embodiment, an NID, such as NID 1300 or 1400, provides upstream noise management or noise mitigation. The NID includes a signal splitter that is operable to separate a downstream signal into a passive branch signal and/or an active branch signal. An active branch circuit transmits the active branch signal to an active subscriber device. An active branch circuit noise manager detects an upstream signal transmitted from the least one active subscriber device and establishes a signal path for the detected upstream signal through the active branch circuit. The NID also includes a passive branch circuit to transmit the passive branch signal to a passive subscriber device.

In a further embodiment of the NID above, the active branch circuit noise manager detects an instantaneous power of the upstream signal and, based on the detection, establishes the signal path for the detected upstream signal through the active branch circuit. The active branch circuit noise manager can determine whether the instantaneous power of the upstream signal exceeds a threshold limit, and, in response to the determination, establish the signal path for the detected upstream signal through the active branch circuit. The active branch circuit noise manager may also determine whether an integration of the instantaneous power indicates that the upstream signal is of unsustained, fleeting power; and based on the determination, terminate the signal path for the detected upstream signal through the active branch circuit.

In another embodiment of any one of the NIDs above, the NID includes a switch that controls transmission of the downstream signal to the active subscriber device. The switch can selectively either enable a transmission of the downstream signal to the active subscriber device or block the transmission of the downstream signal to the active subscriber device. The switch has a signal flow mode and a signal block mode. The switch enables transmission between a CATV network and the active subscriber device when in the signal flow mode and prevents the transmission between the CATV network and the active subscriber device when in the signal block mode. The switch assumes the signal flow mode in response to a normal operation condition and assumes the signal block mode in response to a power-off condition. The switch may also maintain the signal flow mode during the normal operation condition.

In a further embodiment of any one of the NIDs above, the active branch circuit noise manager includes an upstream noise mitigation circuit that mitigates ingress noise by enabling the signal path only for the upstream signals which have a power content that exceeds a predetermined threshold power level.

In another embodiment of any one of the NIDs above, the active branch circuit noise manager maintains the signal path until a designated condition is detected; and blocks the signal path after a designated condition is detected. The designated condition may be a predetermined amount of time. The predetermined amount of time is based on an amount of time to transmit a single valid upstream signal packet of a maximum time duration permitted by a signaling protocol. The designated condition may also be based on an integration of the instantaneous power of a detected signal.

In a further embodiment of any one of the NIDs above, the active branch circuit includes the active branch circuit noise manager. Another embodiment is an NID that provides upstream noise mitigation. The NID includes a signal splitter that separates a downstream signal into a passive branch signal and/or an active branch signal. An active branch circuit transmits the active branch signal to/from an active subscriber device. An active branch circuit noise manager detects an upstream signal transmitted from the least one active subscriber device and establishes a signal path for the detected upstream signal through the active branch circuit. A passive branch circuit transmits the passive branch signal to/from passive subscriber device. The NID also includes a switch (or bypass relay) operable to control transmission of signals to/from the active subscriber device.

In a further embodiment of the NID above, the switch selectively establishes a connection with the active subscriber device and bypasses the connection with the active subscriber device. The switch has a signal flow mode and a signal block mode. In the signal flow mode the switch establishes the connection with the active subscriber device. In the signal block mode the switch prevents the connection with the active subscriber device (for example, by bypassing the active subscriber device). The switch assumes the signal flow mode in response to a normal operation condition, and assumes the signal block mode in response to a power-off condition.

In another embodiment of any one of the NIDs above, the active branch circuit noise manager detects an instantaneous power of the upstream signal and, based on the detection, establishes the signal path for the detected upstream signal through the active branch circuit.

A further embodiment is an NID that provides upstream noise mitigation. The NID includes an input port used to communicate with a CATV network. A signal splitter separates a downstream signal into a passive branch signal and/or an active branch signal. The NID includes a gas tube surge protector located on a connection between the input port and the signal splitter. An active branch circuit transmits the active branch signal to/from an active subscriber device. An active branch circuit noise manager (or noise mitigation circuit) detects an upstream signal transmitted from the least one active subscriber device and establishes a signal path for the detected upstream signal through the active branch circuit. A passive branch circuit transmits the passive branch signal to/from passive subscriber device. A bypass circuit bypasses the signal path through the active branch circuit during a power-off condition.

In another embodiment of the NID above, the active branch circuit noise manager detects an instantaneous power of the upstream signal and, based on the detection, establishes the signal path for the detected upstream signal through the active branch circuit.

In a further embodiment of any one of the NIDs above, the active branch circuit noise manager, in response to establishing the signal path for the detected upstream signal, maintains the signal path for the detected upstream signal for a predetermined amount of time based on an amount of time to transmit a single valid upstream signal packet of a maximum time duration permitted by a signaling protocol.

Another embodiment includes a noise mitigation or noise management circuit that reduces or manages ingress noise. The noise management circuit detects an upstream signal transmitted from an active subscriber device and establishes a signal path for the detected upstream signal through the active branch circuit.

In a further embodiment of an instantaneous power of the upstream signal and, based on the detection, establishes the signal path for the detected upstream signal through the active branch circuit. The noise manager or noise management circuit can determine whether the instantaneous power of the upstream signal exceeds a threshold limit, and, in response to the determination, establish the signal path for the detected upstream signal through the active branch circuit. The noise manager or noise management circuit may also determine whether an integration of the instantaneous power indicates that the upstream signal is of unsustained, fleeting power; and based on the determination, terminate the signal path for the detected upstream signal through the active branch circuit.

In another embodiment of any one of the noise mitigation circuits or noise management circuits above, the noise management circuit mitigates ingress noise by enabling the signal path only for the upstream signals which have a power content that exceeds a predetermined threshold power level. Upstream signals which have a power content that does not exceed a predetermined threshold power level are sent to ground through a termination resistor.

In a further embodiment of any one of noise mitigation or management circuits above, the noise management circuit maintains the signal path until a designated condition is detected; and blocks the signal path after a designated condition is detected. The designated condition may be a predetermined amount of time. The predetermined amount of time is based on an amount of time to transmit a single valid upstream signal packet of a maximum time duration permitted by a signaling protocol. The designated condition may also be based on an integration of the instantaneous power of a detected signal.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A network interface device comprising:
   an active branch circuit configured to transmit an active branch signal to an active subscriber device;
   a noise controller configured to detect whether the upstream signal includes a noise indicative power level, and control transmission of the upstream signal through the active branch circuit based on the detection of whether the upstream signal includes a noise indicative power level and based on whether the noise controller is in a powered state and an unpowered state; and a bypass circuit configured to transmit the active branch signal through a bypass signal path when the noise controller detects that the upstream signal includes a noise indicative power level so as to prevent the upstream signal from being transmitted through the active branch circuit when the upstream signal includes the noise indicative power level and when the noise controller is in the unpowered state, and wherein the bypass circuit is configured to transmit the upstream signal through the active branch circuit only when the noise controller detects that the upstream signal does not include the noise indicative power level so as to allow the upstream signal to be transmitted through the active branch circuit only when the upstream signal does not include the noise indicative power level and when the noise controller is in a powered state.

2. The network interface device of claim 1, wherein the noise controller is configured to detect an instantaneous power of the upstream signal and control transmission of the upstream signal through the active branch circuit based on the detected instantaneous power of the upstream signal.

3. The network interface device of claim 1, wherein the noise controller is further configured to detect whether an instantaneous power level of the upstream signal exceeds a threshold limit, and allow transmission of the upstream signal through the active branch circuit only when the detected instantaneous power level of the upstream signal exceeds the threshold limit.

4. The network interface device of claim 1, wherein the noise controller is further configured to detect whether a power level of the upstream signal comprises the noise indicative power level, and allow transmission of the upstream signal through the active branch circuit only when the detected power level of the upstream signal does not comprise the noise indicative power level.

5. The network interface device of claim 1, wherein the noise controller is configured to maintain a signal path for the upstream signal until a designated condition is detected and block the signal path after the designated condition is detected.

6. The network interface device of claim 5, wherein the designated condition comprises a predetermined amount of time, the predetermined amount of time based on an amount of time to transmit a single valid upstream signal packet of a maximum time duration permitted by a signaling protocol.

7. The network interface device of claim 1, wherein the noise controller is located in a separate enclosure.

8. A network interface device comprising:
an active branch circuit configured to transmit an active branch signal to an active subscriber device;
a noise controller configured to detect whether the upstream signal includes a noise indicative power level, and control transmission of the upstream signal through the active branch circuit based on the detection of whether the upstream signal includes the noise indicative power level; and
a bypass circuit configured to transmit the active branch signal through a bypass signal path when the noise controller detects that the upstream signal includes the noise indicative power level so as to prevent the upstream signal from being transmitted through the active branch circuit when the upstream signal includes the noise indicative power level, and
wherein the bypass circuit is configured to transmit the upstream signal through the active branch circuit only when the noise controller detects that the upstream signal does not include the noise indicative power level so as to allow the upstream signal to be transmitted through the active branch circuit only when the upstream signal does not include the noise indicative power level.

9. The network interface device of claim 8, wherein the noise controller is configured to detect an instantaneous power of the upstream signal and control transmission of the upstream signal through the active branch circuit based on the detected instantaneous power of the upstream signal.

10. The network interface device of claim 8, wherein the noise controller is further configured to detect whether an instantaneous power level of the upstream signal exceeds a threshold limit, and allow transmission of the upstream signal through the active branch circuit only when the detected instantaneous power level of the upstream signal exceeds the threshold limit.

11. The network interface device of claim 8, wherein the noise controller is further configured to detect whether a power level of the upstream signal comprises the noise indicative power level, and allow transmission of the upstream signal through the active branch circuit only when the detected power level of the upstream signal does not comprise the noise indicative power level.

12. The network interface device of claim 8, wherein the noise controller is configured to maintain a signal path for the upstream signal until a designated condition is detected and block the signal path after the designated condition is detected.

13. The network interface device of claim 12, wherein the designated condition comprises a predetermined amount of time, the predetermined amount of time based on an amount of time to transmit a single valid upstream signal packet of a maximum time duration permitted by a signaling protocol.

14. The network interface device of claim 8, wherein the noise controller is located in a separate enclosure.

* * * * *